[54] SOLDER FINISHING PLANAR LEADED FLAT PACKAGE INTEGRATED CIRCUIT LEADS

[75] Inventors: Richard C. Wood; Roger H. Doherty, both of Portland, Me.

[73] Assignee: National Semiconductor Corporation, Santa Clara, Calif.

[21] Appl. No.: 835,208

[22] Filed: Feb. 13, 1992

[51] Int. Cl.⁵ ............................................. C23C 26/00
[52] U.S. Cl. ..................................... 427/96; 118/421; 118/423; 118/425
[58] Field of Search ................. 427/96; 118/423, 425, 118/421

[56] References Cited

U.S. PATENT DOCUMENTS

| | | | |
|---|---|---|---|
| 2,770,875 | 11/1956 | Zimmerman | 118/421 |
| 4,682,563 | 7/1987 | Masuda | 118/423 |
| 4,720,396 | 1/1988 | Wood | 427/96 |

Primary Examiner—Shrive Beck
Assistant Examiner—Vi Duong Dang
Attorney, Agent, or Firm—Daniel H. Kane; James W. Rose; Richard C. Calderwood

[57] ABSTRACT

Apparatus (10) and method for solder finishing the leads of an integrated circuit package are applicable to "flat packs" or flat packages having coplanar rows of leads (84) along sides of the flat package (75). First and second tracks (22,26) are formed with elongate first and second supporting surfaces (72,74) oriented with the first and second supporting surfaces at opposite first and second downwardly depending angles ($\Theta1,\Theta2$). First and second index edges (70) are formed along the respective first and second supporting surfaces of the first and second tracks (22,26) for retaining a flat package (75) at the respective opposite first and second downwardly depending angles. Vertical first and second falling columns of molten solder are established at first and second loci of solder finishing (16a,16b) defined by solder bridge sections (66,68) with the first and second falling columns (85) located on the lower sides of the respective first and second tracks (22,26). A conveyor line (44) formed with pushers (76) pushes the flat package on the respective first and second tracks (22,26) along first and second transport paths (25,28) with respective downwardly depending first and second rows of leads (84) passing through the respective first and second falling columns (85). A tilting mechanism (100) at the transfer end of the track section lifts the flat package from the first track (22), reorients the flat package from the first downwardly depending angle ($\Theta1$) to the second downwardly depending angle ($\Theta2$) and deposits the flat package (75) on the second track (26).

20 Claims, 6 Drawing Sheets

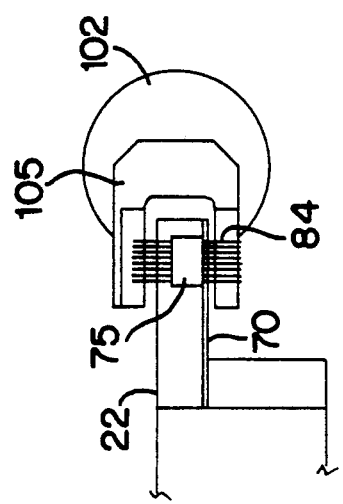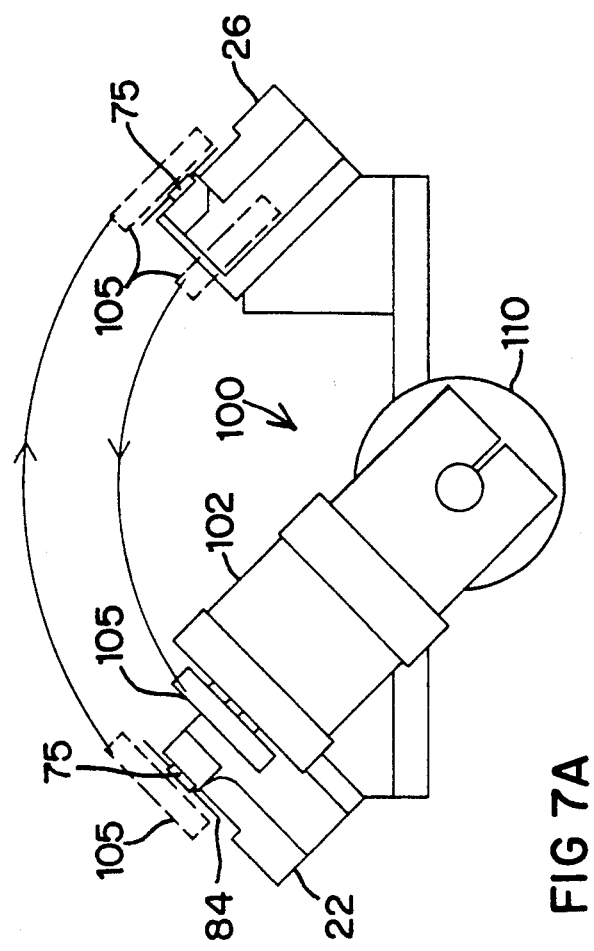

SOLDER FINISHING PLANAR LEADED FLAT PACKAGE INTEGRATED CIRCUIT LEADS

TECHNICAL FIELD

This invention relates to a new apparatus and method for solder finishing the leads of integrated circuit flat packages such as planar leaded "flat packs" having rows of leads coplanar with the flat package. More generally the invention provides a new method and apparatus for liquid treating the leads of a flat package having a row of leads coplanar with the flat package. The apparatus and method provide for solder finishing of multiple rows of leads on the flat package. The invention provides a new track system, new solder bridge section, and new transport system for finishing the leads of the flat pack ICs.

BACKGROUND ART

The Richard C. Wood U.S. Pat. No. 4,720,396, issued Jan. 19, 1988 describes a new system for solder finishing integrated circuit package leads. The machine and method described in U.S. Pat. No. 4,720,396 is directed to solder finishing the leads of a dual-in-line (DIP) integrated circuit package having two downwardly directed parallel rows of leads along the sides of the package. In a DIP the leads of the two parallel rows of leads are folded or bent in a downward direction at right angles to the body of the DIP package.

The solder finishing apparatus in U.S. Pat. No. 4,720,396 establishes two vertical falling columns of falling molten solder spaced apart a distance substantially the width of the package. The DIP package passes between the vertical falling columns along a horizontal track section immersing the two parallel rows of leads along the sides of the package in the respective falling columns of molten solder. The falling columns of molten solder wash the downwardly directed leads of the two rows of leads, washing the leads and depositing a finish layer. Hot gas is directed over the leads of the package as they emerge from the falling columns to eliminate excess solder and bridging of solder between the leads. The monorail track system and the solder bridge track section which defines the locus of solder finishing are horizontally oriented to accommodate the DIP package configuration.

The method and apparatus of U.S. Pat. No. 4,720,396 contemplate solder finishing conventional DIP packages passing along a horizontal track with depending leads directed downwardly. The falling columns of molten solder simultaneously encounter the two rows of leads at this generally vertical downwardly directed angle so that solder runs down the leads under gravity to the solder pot below. This coincident angle of encounter enlists gravity to minimize excess accumulation of solder, solder bridging, and splashing or spattering.

While U.S. Pat. No. 4,720,396 provides a successful solder finishing system for DIP package leads, it did not anticipate the problem of solder finishing flat pack integrated circuit parts with rows of coplanar or axially directed leads. In a flat pack or flat package IC device the leads extend outwardly in the same plane as the body of the flat package. The leads thus lie in the horizontal plane during travel along the track of U.S. Pat. No. 4,720,396. As a result, the columns of falling molten solder encounter horizontally directed leads at right angles rather than at the preferred downwardly depending angles contemplated by U.S. Pat. No. 4,720,396. Gravity does not enhance runoff to minimize solder accumulation and solder bridging, and there is increased splashing and splatter.

OBJECTS OF THE INVENTION

It is therefore an object of the present invention to provide a new solder finishing system solving the problem of solder finishing the leads of IC flat packages.

Another object of the invention is to provide a new apparatus and method for solder finishing the leads of flat pack ICs in falling columns of molten solder with coincident or complementary angles between the falling column and leads to enlist the assistance of gravity to minimize excess solder accumulation, bridging, and splashing or spattering.

A further object of the invention is to provide an apparatus and method for solder finishing all of the coplanar rows of leads of an IC flat package with coincident or complementary angles of encounter between the falling columns of molten solder and the coplanar leads of the flat pack IC devices.

DISCLOSURE OF THE INVENTION

In order to accomplish these results the present invention according to its broadest formulation provides a method and apparatus for liquid treating the leads of a flat package having at least a first row of leads coplanar with the flat package along a first side. A treatment liquid delivery system is constructed for delivering treatment liquid. The treatment liquid delivery system includes a treatment liquid first delivery passageway and first downwardly directed outlet opening for establishing a first falling column of exposed falling treatment liquid. A conveyor is constructed for orienting the flat package at a first downwardly depending angle intermediate between horizontal and vertical orientations. The flat package is oriented with the first side on the lower side of the flat package with the first row of leads depending downward from the lower side at the depending angle. The conveyor is also constructed to pass the flat package adjacent to the first falling column of treatment liquid and immerse the first row of leads in the first falling column at the downwardly depending angle to enhance runoff and reduce spatter and bridging.

In the preferred example the treatment liquid delivery system is also constructed with a second treatment liquid passageway and a second downwardly directed opening for establishing a vertical second falling column of treatment liquid. The conveyor is also constructed for reorienting the flat package at a second depending angle opposite the first depending angle with a second side of the flat package on the lower side. In this second orientation, the second row of leads is depending downward from the lower side at the second depending angle. The conveyor is also constructed to pass the flat package adjacent to the second falling column of molten solder and immerse the second row of leads in the second falling column at the second downwardly depending angle again to enhance runoff and reduce spatter and bridging.

For application in solder finishing, the invention provides a new method of solder finishing the leads of an integrated circuit flat package having at least a first row of leads coplanar with the flat package along a first side. The method provides the steps of establishing a vertical first falling column of falling molten solder; orienting the flat package at a depending angle intermediate between horizontal and vertical orientations with the first side on the lower side of the flat package so that the first row of leads depend downward from the lower side at the depending angle; and passing the flat package adjacent to the first falling column of molten solder, immersing the first row of leads in the falling column at the downwardly depending angle to enhance runoff and reduce spatter and bridging. Hot gas is directed over the leads of the first row of leads as the flat package passes by the falling column further reducing accumulation of excess and bridging.

The first falling column of molten solder is established by pumping molten solder from a solder pot in a first molten solder delivery passageway, discharging the molten solder through a first downwardly directed opening from the first solder delivery passageway, and exposing the falling column for passage of the flat package adjacent to the falling column and for immersion of the first row of leads in the falling column at the downwardly depending angle.

In the preferred example the method is applicable to IC flat packages formed with a first row of leads coplanar with the flat package along a first side and a second row of leads coplanar with the flat package along a second side. The invention provides the further steps of establishing a vertical second falling column of falling molten solder; reorienting the flat package at a second depending angle opposite the first depending angle and intermediate between horizontal and vertical orientations with the second side on the lower side of the flat package and with the second row of leads depending downward from the lower side at the second depending angle; and passing the flat package adjacent to the second falling column of molten solder, immersing the second row of leads in the second falling column at the second downwardly depending angle. Hot gas is also directed over the leads of the second row of leads as the flat package passes by the second falling column further reducing accumulation of excess solder and bridging.

A feature of the method of the present invention is that reorienting the flat package permits solder finishing of multiple rows of leads at respective favorable downwardly depending angles to enhance runoff and reduce spatter and splashing. The method permits enlisting the assistance of gravity on multiple sides of the flat package to minimize excess accumulation of solder and bridging of solder between leads or pins.

In the preferred embodiment the apparatus for solder finishing the leads of an integrated circuit flat package includes a first track with first elongate supporting surface along a first transport path. The first supporting surface is oriented at a first downwardly depending angle and is formed with an index edge along the supporting surface of the track for retaining a flat package at the first downwardly depending angle. A molten solder delivery passageway has a first downwardly directed opening in a configuration for establishing a vertical first falling column of falling molten solder adjacent to the lower side of the track at a first locus of solder finishing. The molten solder delivery passageway and downwardly directed opening are constructed to expose the first falling column at the first locus of solder finishing. A flat package transporter translates a flat package on the first track along the first transport path through the first locus of solder finishing with the first row of leads passing through the first falling column at the first downwardly depending angle.

According to the invention the first transporter is a conveyor chain or conveyor line with a plurality of pushers mounted on the line for pushing flat packages along the first track through the first locus of solder finishing. A solder pot and solder pump coupled to the molten solder delivery passageway pumps molten solder from the solder pot into the passageway and discharges molten solder through the first downwardly directed opening to form the first falling column.

The apparatus may also include a second track having a second elongate supporting surface along a second transport path. The second supporting surface is oriented at a second downwardly depending angle opposite the first downwardly depending angle. The second track is also formed with an index edge along the second supporting surface for retaining a flat package at the second downwardly depending angle with the second row of leads depending from the lower side of the flat package at the second downwardly depending angle.

The molten solder delivery system is also constructed to define a second locus of solder finishing along the second track. The flat package transporter is constructed for transporting a flat package on the second track along the second transport path for passing the flat package through the second locus of solder finishing and immersing a second row of leads in a second falling column at the second downwardly depending angle.

The invention also provides a transfer mechanism for transferring the flat package between the first and second tracks and reorienting the flat package. To accomplish this a lifting and tilting mechanism is positioned at respective ends of the first and second tracks. The lifting and tilting mechanism is a compound reciprocating mechanism constructed for lifting a flat package from the first track at the first downwardly depending angle with the first row of leads depending downward from the lower side of the flat package. The lifting action is accomplished by the first reciprocating action in and out in the axial direction for lifting the flat pack off track 1. The lifting and tilting mechanism then rotates in a second reciprocating mode reorienting the flat package at the second downwardly depending angle with the second row of leads depending from the lower side of the flat package. The lifting and tilting mechanism then retracts and places the reoriented flat package on the second track according to the first reciprocating mode, retracting in the axial direction.

In summary, the apparatus of the invention provides the novel configuration of two tilted tracks for transporting a flat package IC down a first track with one row of leads downwardly tilted or downwardly depending, and for returning the flat package on the second track with another row of leads on the other side of the package downwardly tilted or downwardly depending. The respective coplanar leads are finished on one side of the flat package on the first track at the first locus of solder finishing provided by a new solder bridge and track section. The coplanar leads on the other side of the flat package are finished on the second track at a second locus of solder finishing also provided by a new solder bridge and track section. A compound reciprocating transfer mechanism at the end of the solder finishing apparatus transfers the flat package from the first track to the second track while reorienting the flat package between the first and second opposite depending angles. The leads on only one side of the planar leaded IC are solder finished at a time but the advantage achieved by solder finishing downwardly angled leads is preserved by this two step process of the invention.

Other objects, features and advantages of the invention are apparent in the following specification and accompanying drawings.

BRIEF DESCRIPTION OF THE DRAWINGS

FIG. 7A is a detailed diagrammatic end view of the lifting and tilting transfer mechanism illustrating the compound reciprocating positions of the transfer mechanism for transferring a flat package from the first track to the second track and for reorienting the flat package.

FIG. 7B a detailed fragmentary plan view from above showing the top of the lifting and tilting mechanism at the transfer end of the track with a flat package in position for transfer between tracks.

DESCRIPTION OF PREFERRED EXAMPLE EMBODIMENTS AND BEST MODE OF THE INVENTION

Figure 1:
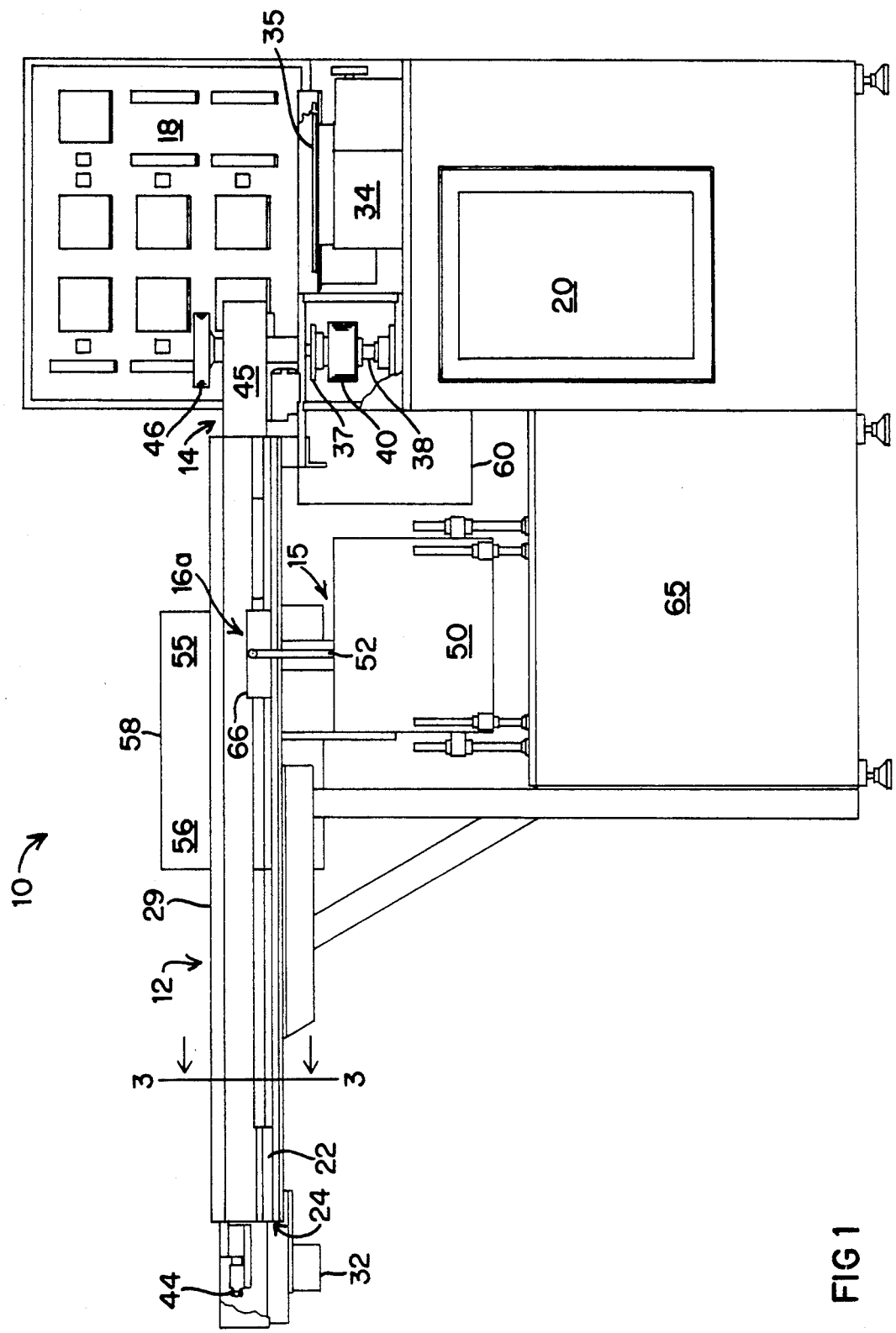
FIG. 1 is a side elevation view of the machine and apparatus for solder finishing the leads of a planar leaded integrated circuit flat package.
Figure 2:
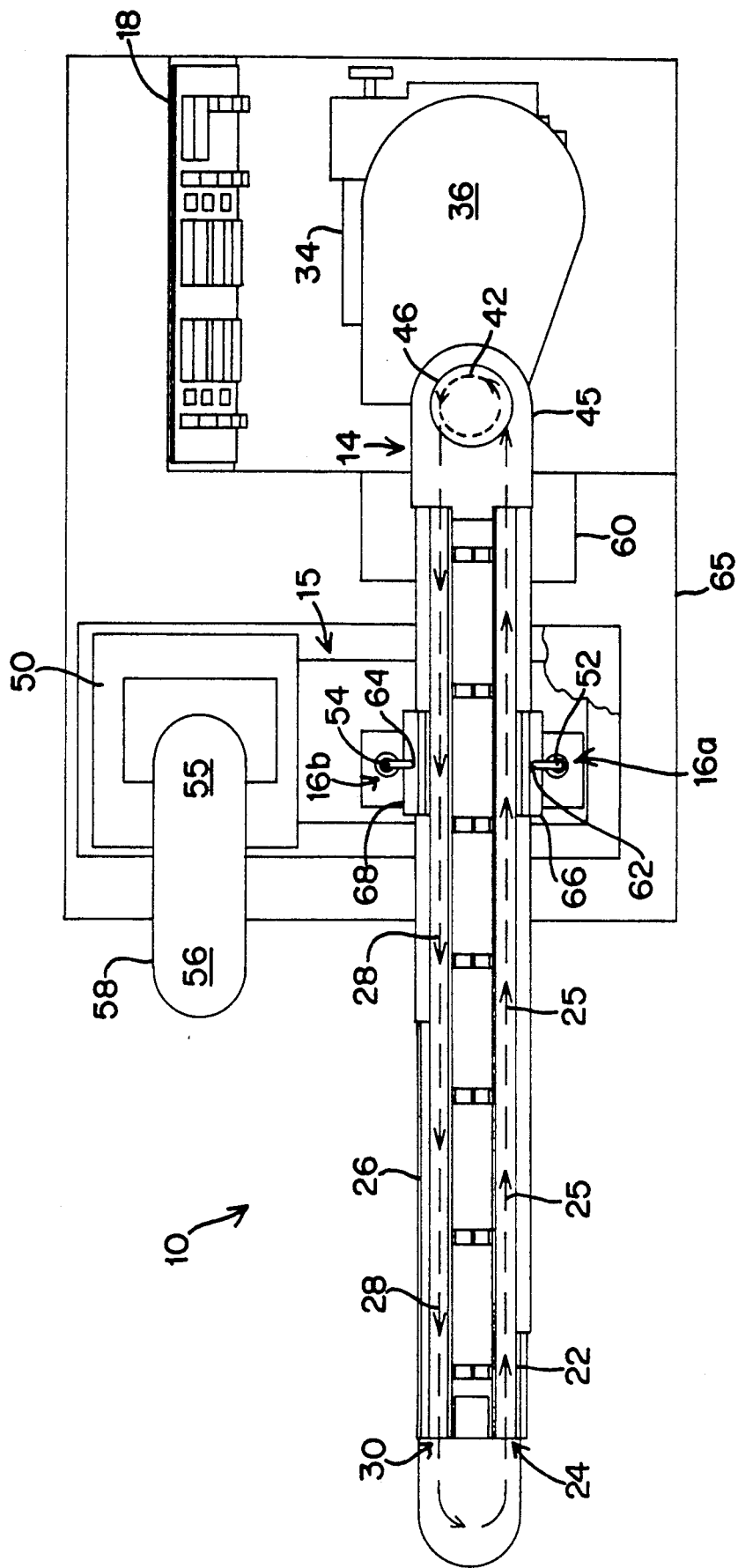
FIG. 2 is a plan view of the machine and apparatus from above.

A machine 10 for solder finishing the leads of IC flat packages according to the invention is illustrated in FIGS. 1 and 2. The elements of the machine apparatus include a track section 12 on which the IC flat packs are transported, a transport drive section 14 for transporting flat packs along the track section 12, a molten solder delivery system 15 for delivering molten solder to the locus of solder finishing 16a, and a control panel 18 including the electronics housing 20. The track section 12 includes a first track 22 with a start loading end 24 for loading an IC flat package on the first track 22 and directing the flat package along a first transport path 25 through the first locus of solder finishing 16a to the transfer end of the first track 22. The transfer end mechanism is hidden under the cover 45 of the transport drive section 14 in FIGS. 1 and 2. The track section 12 also includes a second track 26 which directs the flat package as hereafter described along the second transport path 28 through the second locus of solder finishing 16b to the discharge end or off load end 30 of the second track 26 where the solder finished flat packages dropped through a discharge chute 32.

The transport drive mechanism 34 includes the primary drive motor 34 which turns a large drive sprocket 35 under the sprocket cover 36. The large drive sprocket 35 turns a small drive sprocket 37 on a separate axis 38 which incorporates a spring clutch 40. The axle located on axis 38 drives a chain sprocket 42 above the driven sprocket 37. Chain sprocket 42 drives the conveyor chain or conveyor line 44 which generally follows the first and second transport paths 25,28 following the dashed lines with arrows as shown in FIG. 2 for transport of flat packages on the first and second tracks 22,26 as hereafter described. The chain sprocket 42 is covered by a chain sprocket cover 45 and a hand wheel reset 46 rises above the chain sprocket cover 45 for resetting an index position of the conveyor chain or conveyor line 44.

The molten solder delivery system 15 includes a solder pot 50 and first and second molten solder delivery passageways 52 and 54. Molten solder is pumped through the molten solder delivery passageways 52 and 54 by a solder pump 55 belt driven by a pump motor 56 all contained under a motor and pump housing cover 58. The respective molten solder delivery passageways 52,54 terminate in downwardly directed openings 62,64 formed in respective solder bridge sections 66,68 of first and second track sections 22,26 to establish the vertical first and second falling columns of molten solder for solder finishing as hereafter described.

As shown in FIGS. 1 & 2, the first and second tracks 22,26 of the track section 12 may be covered with track section covers 29. Also visible in FIGS. 1 & 2 is a cover 60 for the nitrogen gas heater which heats $N_2$ gas to be directed on the finished leads as hereafter described. The entire machine apparatus for solder finishing is mounted on a base 65.

Figure 3A:
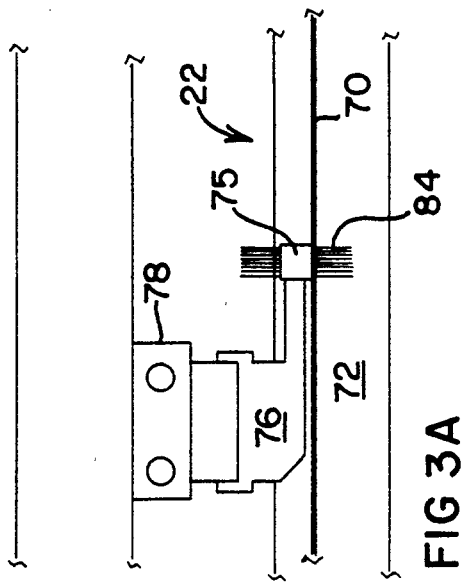
FIG. 3A is a fragmentary detailed side view of a section of the track and conveyor showing a pusher mounted on the conveyor pushing an IC flat package supported by the index edge on the track along the transport path.
Figure 3:
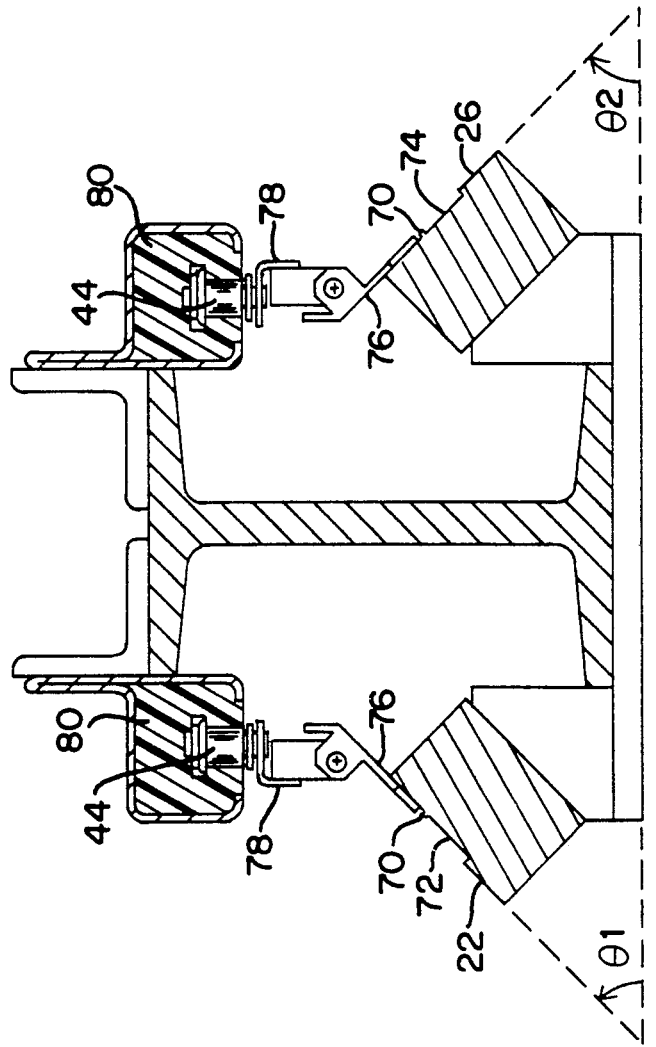
FIG. 3 is an end cross section view through the track section in the direction of the arrows on lines 3-3 of FIG. 1.

As shown in the cross section through the track section 12 illustrated in FIG. 3, the first and second tracks 22,26 are formed with elongate first and second supporting surfaces 72,74 oriented at opposite first and second downwardly depending angles. The inclined supporting surfaces 72,74 of the first and second tracks 22,26 form opposite acute angles $\Theta 1$, $\Theta 2$ with the horizontal in the range of approximately, for example, 45°–50°. Index edges 70 are formed along the first and second supporting surfaces 72,74 of the first and second tracks 22,26 to retain a flat package at the respective opposite first and second downwardly depending angles during transport along the tracks.

As shown in FIG. 3A an IC flat package 75 resting on the index edge 70 of track 22 is pushed along the first transport path by pusher arm 76 secured to a lug 78 suspended from the conveyor chain 44 as shown in FIG. 3. The conveyor chain 44 driven by the transport drive mechanism 14 is suspended from a channel 80 formed over the transport paths of a low friction plastic such as Torlon (TM) bearing surface plastic for smooth conveyor travel by the conveyor chain or conveyor line as shown in FIG. 3.

Figure 4:
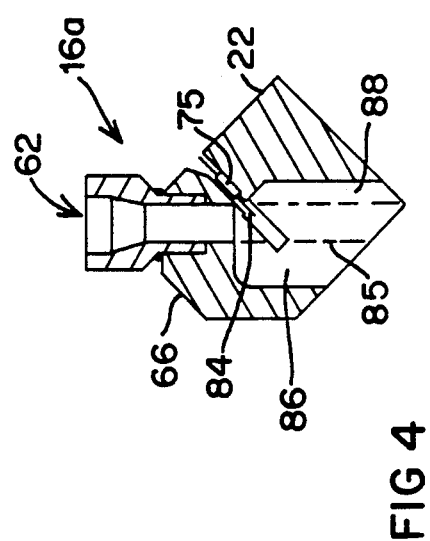
FIG. 4 is a detailed fragmentary cross section view through the solder bridge section and track section at the locus of solder finishing showing a falling column of molten solder finishing the row of leads depending downwardly from the lower side of a flat package as it is transported along the track.

Referring to FIG. 4, when the flat package 75 reaches the first locus of solder finishing 16A, the downwardly depending leads 84 depending at the acute downwardly depending angle from the lower side of flat package 75 pass through the vertical first falling column 85 of molten solder washing the leads and depositing a finishing layer of molten solder on the leads. The downwardly depending angle enlists the assistance of gravity and reduces accumulation of excess solder and bridging of solder between leads. The first falling column 85 is formed by molten solder delivered through the downwardly directed opening 62 from the first molten solder delivery passageway 52 and through an opening formed in the first solder bridge section 66. The molten solder delivery system 15 delivers the molten solder with slight positive pressure above atmosphere to reduce turbulence in the falling column.

The solder bridge section 66 is formed with an appropriate opening 86 to expose the first falling column 85 of molten solder for passing the first row of leads 84 through the falling column of molten solder. Similarly the adjacent track section of track 22 at the first locus of solder finishing 16a is formed with a cut out 86 to provide clearance for the first falling column 85. The second locus of solder finishing 16b, second solder bridge section 68 and second track 26 are similarly constructed at the second locus of solder finishing 16b.

Figure 5:
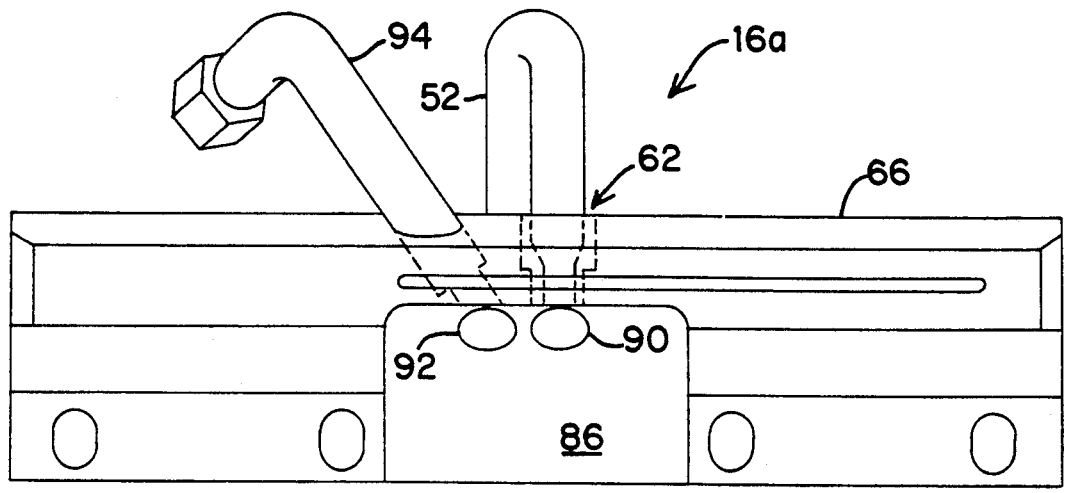
FIG. 5 is a detailed side elevation view of the solder bridge defining the locus of solder finishing.

One of the solder bridge sections 66 is shown in more detail in FIG. 5. The solder bridge section 66 is inverted or turned around from the position in FIG. 1 to look into the cut out opening 86 which provides the necessary clearance for exposing the first falling column 85 of liquid molten solder discharged from the downwardly directed opening end 62 of the first molten solder delivery passageway 52. The first falling column of molten solder emerges from the opening 90 formed in the cut out region 86 of the solder bridge section 66. Downstream from the molten solder falling column delivery opening 90 in the direction of travel of a flat package along the first transport path (keeping in mind that the actual configuration of solder bridge section 66 is inverted) is a second discharge opening 92 for delivering hot nitrogen gas under pressure through $N_2$ delivery passageway 94 for further reducing unwanted accumulation of excess solder.

Figure 6:
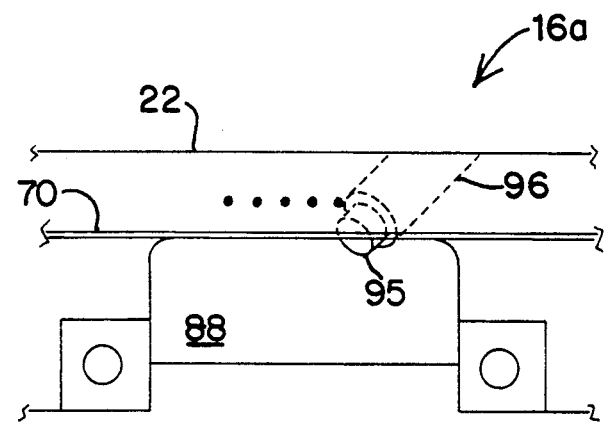
FIG. 6 is a detailed fragmentary side view of the track section adjacent to the solder bridge section further defining the locus of solder finishing.

The adjacent track section of the first track 22 underlying solder bridge section 66 at the first locus of solder finishing 16a is illustrated in FIG. 6. The portion of the track 22 below index edge 70 at the first locus of solder finishing 16a is cut away forming the cut out opening 88 to provide necessary clearance for the first falling column 85 of molten solder. Down stream from the first falling column in the direction of travel of a flat pack along the first transport path, the track section is formed with a second $N_2$ discharge opening 95 for discharging a second stream of hot nitrogen gas delivered through a second $N_2$ delivery passageway 96. The first and second $N_2$ discharge openings 92,95 and $N_2$ delivery passageways 94,96 are constructed in a configuration for directing hot nitrogen gas over the leads from opposite sides of the first row of leads.

Figure 7:
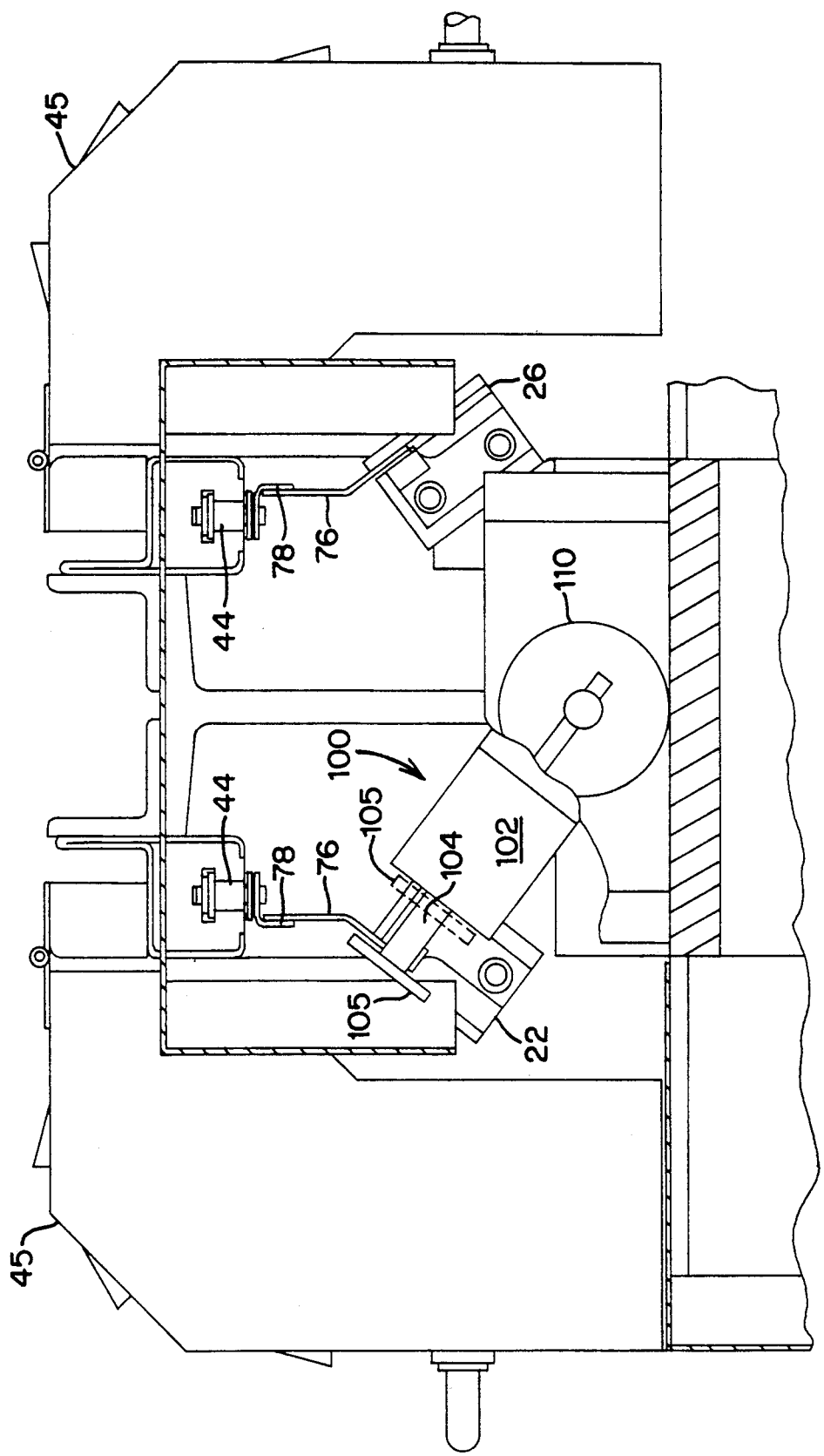
FIG. 7 is a detailed fragmentary end view partially cut away showing the end of the track section at the transport drive end of the track section and the compound reciprocating lifting and tilting transfer mechanism for transferring a flat package from the first track to the second track and for reorienting the flat package.

The flat package transfer mechanism at the transfer end of track section 12, positioned beneath chain sprocket drive cover 45, is illustrated in FIG. 7. The flat package transfer mechanism 100 is a compound reciprocating mechanism that reciprocates in an axial direction for lifting a flat package from the first track 22 and depositing it on the second track 26 and reciprocates in a rotary direction for reorienting the flat pack from the first depending angle $\Theta 1$ to the second downwardly depending angle $\Theta 2$. The two acute angles $\Theta 1$ and $\Theta 2$ are oppositely directed for solder finishing leads of first and second rows of coplanar leads along opposite sides of the flat package. Axial reciprocation is provided by a pneumatic air cylinder 102 with an axially reciprocating piston 104 having a horseshoe shaped head 105 for lifting an IC flat package 75 from the transfer end of first track 22 without interference with the track. The lifting head 105 may be magnetized to hold the leads of the flat pack against the head during transfer.

Interference between the lifting head 105 and the conveyor chain 44 with pushers 76 is avoided by coordinating intermittent motion of the conveyor chain, index positioning of the conveyor chain, and the intermittent reciprocating motion of the transfer mechanism 100. For this purpose the basic drive motor 34 shown in FIGS. 1 & 2 incorporates an indexer such as a CAMCO (TM) indexer which drives the conveyer chain in, for example, 6 inch (21 cm) intervals or increments with stops between increments.

Reciprocation in the rotary direction is provided by a rotary actuator 110 which rotates and reorients or tilts the flat package 75 from the first downwardly directed angle $\Theta 1$ to the second downwardly directed angle $\Theta 2$ after the flat package is lifted from the first track 22 by the extended piston head 105. The flat package 75 is then deposited on the second track 26 by retraction of piston head 105 as illustrated in FIG. 7A.

Once deposited on the second track 26, the flat package 75 is transported by a pusher arm 76 along the index edge 70 of the second track 26 through the second locus of solder finishing 16b to the off load end 30 of the second track 26 and through the off load chute 32.

While the invention has been described with reference to particular example embodiments it is intended to cover all modifications and equivalents within the scope of the following claims.

We claim:

1. An automated method for solder finishing the leads of an integrated circuit (IC) flat package having first and second rows of leads coplanar with the flat package along respective first and second sides of the flat package, comprising:

establishing a vertical first falling column of falling molten solder;

orienting the flat package at a first downwardly depending angle intermediate between horizontal and vertical orientations with the first side on the lower side of the flat package and with the first row of leads depending downward from the lower side at said fist downwardly depending angle;

conveying the flat package at said first downwardly depending angle adjacent to the first falling column of molten solder and immersing the first row of leads in the falling column at said downwardly depending angle to enhance runoff and reduce spatter and bridging;

establishing a vertical second falling column of falling molten solder;

automatically reorienting the flat package at a second downwardly depending angle opposite the first downwardly depending angle and intermediate between horizontal and vertical orientations with the second side on the lower side of the flat package and with the second row of leads depending downward from the lower side at said second downwardly depending angle; and conveying the flat package at said second downwardly depending angle adjacent to the second falling column of molten solder and immersing the second row of lead in the second falling column at said second downwardly depending angle to enhance runoff and reduce spatter and bridging:

said step of reorienting the flat package to the opposite second downwardly depending angle comprises lifting the flat package at the first downwardly depending angle, swinging the flat package through an arc, and depositing the flat package at the second downwardly depending angle.

2. The method of claim 1 wherein the step of establishing the vertical first falling column of molten solder comprises pumping molten solder from a solder pot in a first solder passageway, discharging the molten solder through a first downwardly directed opening from the first solder passageway, and exposing the falling column for conveyance of the flat package at said first downwardly depending angle adjacent to the first falling column and for immersion of the first row of leads in the falling column at said downwardly depending angle.

3. The method of claim 2 wherein the step of passing the flat package adjacent to the first falling column comprises:

providing a first track along a first transport path with an elongate first supporting surface, orienting the supporting surface at said first downwardly depending angle, and forming an index edge along the first supporting surface of the track for retaining a flat package along the first transport path at said downwardly depending angle;

establishing the first falling column at a first locus of solder finishing on the side of the track;

and pushing a flat package on the first transport path along the first track and through the first locus of solder finishing and immersing the leads of the downwardly depending first row of leads in the first falling column.

4. The method of claim 3 wherein the step of establishing the second vertical falling column of molten solder comprises pumping molten solder from a solder pot in a second solder passageway, discharging the molten solder through a second downwardly directed opening from the solder passageway, and exposing the second falling column for conveyance of the flat package adjacent to the second falling column at said second downwardly depending angle and for immersion of the second row of leads in the second falling column at said second downwardly depending angle.

5. The method of claim 4 wherein the steps of passing the flat package adjacent to the respective first and second falling columns comprise:

providing first and second tracks having elongate first and second supporting surfaces along first and second transport paths, orienting the first and second supporting surfaces at said opposite first and second downwardly depending angles, and forming first and second index edges along the respective first and second supporting surfaces of the first and second tracks for retaining a flat package at said opposite first and second downwardly depending angles;

establishing the first and second falling columns at first and second loci of solder finishing on the lower sides of the respective first and second supporting surfaces of the first and second tracks;

pushing a flat package at the first downwardly depending angle on the first transport path along the first track with the downwardly depending first row of leads passing through the first locus of solder finishing;

automatically reorienting the flat package to the opposite second downwardly depending angle; and pushing the flat package at said second downwardly depending angle on the second transport path along the second track with the downwardly depending second row of leads passing through the second locus of solder finishing.

6. An automated method for liquid treating the leads of a flat package having first and second rows of leads coplanar with the flat package along first and second sides of the flat package comprising:

establishing a vertical first falling column of exposed falling treatment liquid;

orienting the flat package at a first downwardly depending angle intermediate between horizontal and vertical orientations with the first side on the lower side of the flat package and with the first row of lead depending downward from the lower side at said first downwardly depending angle;

conveying the flat package at said first downwardly depending angle adjacent to the first falling column of treatment liquid and immersing the first row of leads in the first falling column at said downwardly depending angle to enhance runoff and reduce spatter and bridging between leads;

establishing a vertical second falling column of exposed falling treatment liquid;

automatically reorienting the flat package to a second downwardly depending angle opposite the first downwardly depending angle and intermediate between horizontal and vertical orientations with the second side on the lower side of the flat package and with the second row of leads depending downward from the lower side at said second downwardly depending angle; and conveying the flat package at said second downwardly depending angle adjacent to the second falling column of treatment liquid and immersing the second row of leads in the second falling column at said second downwardly depending angle to enhance runoff and reduce spatter and bridging between leads;

said step of reorienting the flat package to the opposite second downwardly depending angle comprising lifting the flat package at the first downwardly depending angle, swinging the flat package through an arc, and depositing the flat package at the second downwardly depending angle.

7. Apparatus for solder finishing the leads of an integrated circuit (IC) flat package having first and second rows of leads coplanar with the flat package along first and second sides of the flat package, comprising:

a first track having an elongate first supporting surface along a first transport path, said first supporting surface being oriented at a first downwardly depending angle intermediate between horizontal and vertical orientations, said first supporting surface being formed with an index edge along the first supporting surface of the track for retaining a flat package at said first downwardly depending angle;

a first molten solder delivery passageway having a first downwardly directed opening for establishing a vertical first falling column of falling molten solder adjacent to the lower side of the downwardly depending first supporting surface of the first track at a first locus of solder finishing, said first molten solder delivery passageway and downwardly directed opening being constructed to expose the first falling column at the first locus of solder finishing;

a first flat package transporter for translating a flat package on the first track along the first transport path through the first locus of solder finishing with a first row of leads passing through the first falling column at said first downwardly depending angle;

a second track having an elongate second supporting surface along a second transport path, said second supporting surface being oriented at a second downwardly depending angle opposite the first downwardly depending angle, said second track being formed with an index edge along the second supporting surface for retaining a flat package at said second downwardly depending angle with the second row of leads depending from the lower side of the flat package at said second downwardly depending angle;

a second molten solder delivery passageway having a second downwardly directed opening for discharging a vertical second falling column of falling molten solder adjacent to the lower side of the downwardly depending second supporting surface of the second track at a second locus of solder finishing, said second molten solder delivery passageway and second downwardly directed opening being constructed to expose the second falling column at the second locus of solder finishing;

a second flat package transporter for transporting a flat package at said second downwardly depending angle along the second transport path for passing the flat package through the second locus of solder finishing and immersing the second row of leads in the second falling column at the second downwardly depending angle; and an automatic lifting and tilting mechanism positioned at the same respective ends of the first and second tracks, said lifting and tilting mechanism being constructed for lifting a flat package from the first track at the first downwardly depending angle with the first row of leads depending downward from the lower side of the flat package, tilting and reorienting the flat package at said second downwardly depending angle with the second row of leads depending from the lower side of the flat package at said second downwardly depending angle, and placing the reoriented flat package on the second supporting surface of the second track.

8. The apparatus of claim 7 wherein the first track is constructed with at least one hot gas passageway at the first locus of solder finishing with an outlet oriented to direct hot gas over the leads of the first row of leads as the leads pass through the first falling column.

9. The apparatus of claim 7 wherein the transporter comprises a conveyor having a conveyor line and a plurality of pushers mounted on the conveyor line for pushing flat packages along the first track through the first locus of solder finishing.

10. The apparatus of claim 9 comprising a solder pot and a solder pump coupled to the first solder delivery passageway for pumping molten solder from the solder pot into the first solder delivery passageway and discharging molten solder through the first downwardly directed opening to form the first falling column.

11. The apparatus of claim 10 wherein the solder pot and solder pump are constructed for delivering molten solder through the second molten solder delivery passageway and second downwardly directed opening for establishing the second falling column.

12. The apparatus of claim 11 wherein the first and second loci of solder finishing of the respective first and second tracks comprise first and second track sections formed with cut outs on the lower side of the track to provide clearance for the respective first and second falling columns.

13. Apparatus for solder finishing the leads of an integrated circuit (IC) flat package having a first row of leads coplanar with the flat package along a first side and a second row of leads coplanar with the flat package along a second side opposite the first side, comprising:

a molten solder delivery system constructed for delivering molten solder, said delivery system comprising a first molten solder delivery passageway having a first downwardly directed outlet opening for discharging a vertical first falling column of falling molten solder;

a flat package conveyor for transporting flat packages, said conveyor being constructed to orient the flat packages at a first downwardly depending angle intermediate between horizontal and vertical orientations with the first side on the lower side of the flat package and with the first row of lead depending downward from the lower side at said first downwardly depending angle, said conveyor being constructed to transport flat packages adjacent to the first falling column of molten solder and immerse the first row of leads in the first falling column at said first downwardly depending angle to enhance runoff and reduce spatter and bridging;

said molten solder delivery system comprising a second molten solder delivery passageway and a second downwardly directed opening from the second molten solder delivery passageway for establishing a vertical second falling column of falling molten solder;

said conveyor being constructed for reorienting a flat package at a second depending angle opposite the first depending angle with the second side on the lower side of the flat package and with the second row of leads depending downward from the lower side at said second downwardly depending angle, said conveyor also being constructed to pass the flat package adjacent to the second falling column of molten solder and immerse the second row of leads in the second falling column at said second downwardly depending angle to enhance runoff and reduce spatter and bridging;

said flat package conveyor comprising a first track having an elongate first supporting surface along a first transport path, said first supporting surface being oriented at said first downwardly depending angle, said first track being formed with an index edge along the first supporting surface of the track for retaining a flat package at said first downwardly depending angle, a translating conveyor line, and a plurality of pushers mounted on the translating conveyor line for pushing flat packages on the first track along the first transport path at said first downwardly depending angle;

said conveyor comprising a second track having an elongate second supporting surface along a second transport path, the second supporting surface being oriented at a second downwardly depending angle opposite the first downwardly depending angle, said second track being formed with an index edge along the second supporting surface for retaining a flat package at the second downwardly depending angle, said translating conveyor line comprising mounted pushers positioned for pushing flat packages along the second track and second transport path at said second downwardly depending angle; and a lifting and tilting mechanism positioned at respective ends of the first and second tracks, said lifting and tilting mechanism being constructed for lifting a flat package from the first track at the first downwardly depending angle with the first row of leads depending downward from the lower side of the flat package, tilting and reorienting the flat package at said second downwardly depending angle with the second row of leads depending from the lower side of the flat package at said second downwardly depending angle, and placing the reoriented flat package on the second supporting surface of the second track.

14. The apparatus of claim 13 wherein the molten solder delivery system comprises a solder pot and a solder pump coupled to the first molten solder delivery passageway for discharging the molten solder through the first downwardly directed opening.

15. The apparatus of claim 13 wherein the lifting and tilting mechanism comprises a reciprocating cylinder formed with a lifting head reciprocating between extended and retracted positions for lifting and depositing a flat package, and a reciprocating rotary actuator, said reciprocating cylinder being mounted on the reciprocating rotary actuator for reciprocal rotation of the reciprocating cylinder between a first location adjacent to the first track for lifting a flat package from the first track at the first downwardly depending angle and a second location adjacent to the second track for depositing the flat package on the second track at the second downwardly depending angle.

16. The apparatus of claim 7 wherein the lifting and tilting mechanism comprises a reciprocating cylinder formed with a lifting head reciprocating between extended and retracted positions for lifting and depositing a flat package, and a reciprocating rotary actuator, said reciprocating cylinder being mounted on the reciprocating rotary actuator for reciprocal rotation of the reciprocating cylinder between a first location adjacent to the first track for lifting a flat package from the first track at the first downwardly depending angle and a second location adjacent to the second track for depositing the flat package on the second track at the second downwardly depending angle.

17. The apparatus of claim 16 wherein the reciprocating cylinder lifting head comprises a generally horseshoe shaped lifting head for lifting the flat package from the two rows of pins.

18. The apparatus of claim 16 further comprising an indexer coupled to the translating conveyor for causing intermittent motion of the translating conveyor in coordination with the reciprocating motion of the reciprocating cylinder and reciprocating rotary actuator.

19. The method of claim 1 wherein the steps of lifting the flat package from the first tack and depositing the flat package on the second track comprise actuating a reciprocating cylinder formed with a lifting head for engaging the flat package, and wherein the step of swinging the flat package in an arc from a position adjacent to the first track to a position adjacent to the second track comprises mounting the reciprocating cylinder on a reciprocating rotary actuator and actuating the reciprocating rotary actuator for reciprocal rotation between said first and second positions.

20. The method of claim 6 wherein the steps of lifting the flat package and depositing the flat package comprise actuating a reciprocating cylinder formed with a lifting head for engaging the flat package, and wherein the step of swinging the flat package in an arc comprises mounting the reciprocating cylinder on a reciprocating rotary actuator and actuating the reciprocating rotary actuator for reciprocal rotation.

* * * * *